United States Patent [19]

Wu

[11] Patent Number: 5,401,695
[45] Date of Patent: Mar. 28, 1995

[54] PROCESS FOR PREPARING CERAMIC PRODUCTS

[75] Inventor: Xianliang Wu, Dresher, Pa.

[73] Assignee: Rohm and Haas Company, Philadelphia, Pa.

[21] Appl. No.: 185,746

[22] Filed: Jan. 24, 1994

[51] Int. Cl.$^6$ .............................................. C04B 35/02
[52] U.S. Cl. ..................................... 501/87; 501/97; 501/103; 501/108; 501/134; 501/137; 501/152; 501/153; 501/154; 501/126; 501/127; 501/109; 501/133; 524/556
[58] Field of Search .............. 501/87, 88, 97, 98, 501/103, 108, 127, 136, 153, 154, 134, 137, 152, 126, 109, 133; 524/556, 609

[56] References Cited

U.S. PATENT DOCUMENTS

| | | | |
|---|---|---|---|
| 4,836,966 | 6/1989 | Shimuzu et al. | 264/63 |
| 4,968,460 | 11/1990 | Thompson et al. | 264/6 |
| 5,086,093 | 2/1992 | Miller | 501/127 |
| 5,215,693 | 6/1993 | Lee | 264/62 |
| 5,281,650 | 1/1994 | Burk et al. | 524/430 |
| 5,283,213 | 2/1994 | Ohst et al. | 501/87 |

FOREIGN PATENT DOCUMENTS

| | | |
|---|---|---|
| 130031 | 1/1985 | European Pat. Off. . |
| 543374 | 5/1993 | European Pat. Off. . |
| 23408 | 3/1975 | Japan . |
| 122768 | 7/1985 | Japan . |
| 122770 | 7/1985 | Japan . |

OTHER PUBLICATIONS

"Particle and Granule Parameters Affecting Compaction Efficiency in Dry Pressing", J. Zheng and J. S. Reed, Journal of the American Ceramic Society, 71 [11], pp. 456–458, (1988) no month.

*Primary Examiner*—Mark L. Bell
*Assistant Examiner*—Michael Marcheschi
*Attorney, Agent, or Firm*—David T. Banchik

[57] ABSTRACT

A method for improving the properties of ceramic green bodies is provided. In particular, ceramic green bodies having improved green strength are provided. Incorporating certain acid-containing polymers as binders at a level of at least about 1 to about 15, preferably at least about 3 to about 10 percent by weight based on the weight of ceramic particles improves the green strength of the resulting ceramic green bodies.

6 Claims, No Drawings

PROCESS FOR PREPARING CERAMIC PRODUCTS

The present invention relates to a process for preparing ceramic products. More particularly, the present invention relates to a dry-pressing process for preparing ceramic products by using selected binders. Ceramic green bodies prepared using these selected binders have improved green strength and improved green density.

Ceramic materials are often used to prepare lightweight, strong, thermally and chemically resistant products useful as chromatographic media, grinding aids, abrasives, catalysts, adsorbents, electronic components, construction components and machine components.

In the manufacture of ceramic products, ceramic materials in the form of a powder are subjected to elevated pressures to produce what is known as a ceramic green body. Methods for compacting, or subjecting the ceramic materials to elevated pressures, to produce ceramic bodies include pressing, extrusion, roll compaction and injection molding. Pressing methods include dry pressing, isostatic pressing and semi-wet pressing. Using these methods, ceramic green bodies can be prepared in various shapes and sizes. The size and shape of the green bodies can also be altered by machining, cutting or stamping the green body.

The properties of the green bodies generally affect the properties of the final ceramic product. The final ceramic product is generally prepared by sintering the ceramic green body. If the green density of the ceramic green body is too low, the mechanical properties of the final ceramic product, such as hardness, will diminish. If the green strength of the ceramic green body is too low, it becomes difficult or impossible to process the ceramic green body. Thus, it is desirable to provide ceramic green bodies with increased green densities and green strengths.

One method for increasing green strengths of ceramic green bodies is to use a binder as a processing aid in the preparation of ceramic green bodies. Currently, the primary commercial binders used in the manufacture of ceramic green bodies are polyvinyl alcohol ("PVA") and poly(ethylene glycol) ("PEG"). These binders are somewhat effective at increasing the green strength of ceramic green bodies. However, PEG and PVA suffer from several drawbacks. PEG does not result in particularly good green strength. PVA results in acceptable green strength, but causes a lowering in green density. Also, these polymers are sensitive to changes in humidity. Furthermore, PEG and PVA tend to produce a substantial increase in the viscosity of the ceramic slurries containing them.

Another commonly used binder, which also functions as a dispersant, is lignosulfonate. Lignosulfonates, also known as lignin sulfonates and sulfite lignins, generally provide sufficient green strength to enable handling of the green bodies. However, lignosulfonate suffers from other drawbacks. For example, when ceramic products are prepared using lignosulfonate, high levels of sulfurous by-products are liberated when the ceramic is fired. It is desirable to replace lignosulfonates with a binder which maintains or improves the performance while reducing or eliminating the harmful sulfurous by-products. Furthermore, lignosulfonates do not impart sufficient green strength to ceramic green bodies for the green bodies to withstand milling, drilling, grinding, cutting and other conventional machining processes.

U.S. Pat. No. 5,215,693 to Lee discloses a method for preparing machinable ceramic products. The method disclosed by Lee uses organic binders such as paraffin wax, thermoplastic polymers such as polymethylmethacrylate/styrene polymers, and other water-insoluble polymers. However, the method disclosed by Lee has several drawbacks because it requires the impregnation of the binders after the green bodies are formed. Furthermore, the impregnation is generally conducted with an organic solvent which increases the time, costs and hazards associated with the process.

The present invention seeks to overcome the problems associated with the previously known methods. The present invention seeks to provide a process for preparing ceramic green bodies using polymeric additives which (1) provide good dispersant properties; (2) provide good mold release during the pressing stage; (3) impart good strength at room temperature as well as at the higher temperatures; (4) provide high green density to the green part; (5) burn-out cleanly in air, and (6) leave low burn out residuals in nitrogen.

In a first aspect of the present invention there is provided a method for preparing ceramic green bodies comprising:

1) forming a ceramic mixture by mixing
   (a) ceramic particles;
   (b) one or more binders selected from the group consisting of polymers comprising, as polymerized units, at least 20 percent by weight of one or more monoethylenically unsaturated acids, and salts thereof; and optionally,
   (c) water; and optionally
   (d) one or more conventional additives;
2) introducing the ceramic mixture into a mold; and
3) subjecting the mold containing the ceramic mixture to elevated pressure to form a ceramic green body.

In a second aspect of the present invention there is provided a method for improving the machinability of ceramic green bodies comprising:

incorporating into a ceramic mixture precursor of the ceramic green bodies one or more binders selected from the group consisting of polymers comprising, as polymerized units, at least 20 percent by weight of one or more monoethylenically unsaturated acids, and salts thereof.

In a third aspect of the present invention there is provided a machinable ceramic green body comprising;
   (a) ceramic particles; and
   (b) one or more binders selected from the group consisting of polymers comprising, as polymerized units, at least 20 percent by weight of one or more monoethylenically unsaturated acids, and salts thereof.

Ceramic particles suitable for the present invention include oxide, nitride and carbide ceramics. Examples of suitable ceramic particles include alumina, aluminum nitride, silica, silicon, silicon carbide, silicon nitride, sialon, zirconia, zirconium nitride, zirconium carbide, zirconium boride, titania, titanium nitride, titanium carbide, barium titanate, titanium boride, boron nitride, boron carbide, tungsten carbide, tungsten boride, tin oxide, ruthenium oxide, yttrium oxide, magnesium oxide, calcium oxide, and mixtures thereof. The morphology of the ceramic particles is not critical but is preferably approximately spherical. Preferably, the ceramic particles are in the form of a powder. The ceramic particles may also be in the form of a slurry. When used as a slurry, the slurry generally contains the one or more ceramic particles are at a level of from about 10 to about 98, preferably from about 30 to about 80 percent by weight of the ceramic slurry.

The polymers suitable for the present invention are polymers comprising, as polymerized units, at least 20 percent by weight of one or more monoethylenically unsaturated acids, or salts thereof. Monoethylenically unsaturated acids can be monoacids, di-acids or polyacids and the acids may be carboxylic acids, sulphonic acids, phosphonic acids, salts or combinations thereof. Suitable monoethylenically unsaturated acids are, for example, acrylic acid, methacrylic acid, crotonic acid, vinylacetic acid and the alkali metal and ammonium salts thereof. Suitable monoethylenically unsaturated dicarboxylic acids and the anhydrides of the cisdicarboxylic acids are, for example, maleic acid, maleic anhydride, 1,2,3,6-tetrahydrophthalic anhydride, 3,6-epoxy-1,2,3,6-tetrahydrophthalic anhydride, 5-norbornene-2,3-dicarboxylic anhydride, bicyclo[2.2.2]-5-octene-2,3-dicarboxylic anhydride, 3-methyl-1,2,6-tetrahydrophthalic anhydride, 2-methyl-1,3,6-tetrahydrophthalic anhydride, itaconic acid, mesaconic acid, fumaric acid, citraconic acid, 2-acrylamido-2-methylpropanesulfonic acid, allylsulfonic acid, allylphosphonic acid, allyloxybenzenesulfonic acid, 2-hydroxy-3-(2-propenyloxy) propanesulfonic acid, isopropenylphosphonic acid, vinylphosphonic acid, styrenesulfonic acid, vinylsulfonic acid and the alkali metal and ammonium salts thereof. Most preferably, the one or more monoethylenically unsaturated acids are acrylic acid, methacrylic acid or the alkali metal salts thereof. The one or more monoethylenically unsaturated acids represent at least about 20 percent by weight of the total monomer weight, preferably at least about 40 percent by weight of the total monomer weight.

In addition, the polymers of the present invention may contain, as polymerized units, one or more monoethylenically unsaturated acid-free monomers. Suitable monoethylenically unsaturated acid-free monomers include $C_1$-$C_4$ alkyl esters of acrylic or methacrylic acids such as methyl acrylate, ethyl acrylate, butyl acrylate, methyl methacrylate, ethyl methacrylate, butyl methacrylate and isobutyl methacrylate; hydroxyalkyl esters of acrylic or methacrylic acids such as hydroxyethyl acrylate, hydroxypropyl acrylate, hydroxyethyl methacrylate, and hydroxypropyl methacrylate. Other monoethylenically unsaturated acid-free monomers are acrylamides and alkyl-substituted acrylamides including acrylamide, methacrylamide, N-tertiarybutylacrylamide, N-methylacrylamide, and N,N-dimethylacrylamide. Other examples of monoethylenically unsaturated acid-free monomers include acrylonitrile, methacrylonitrile, allyl alcohol, phosphoethyl methacrylate, 2-vinylpyridene, 4-vinylpyridene, N-vinylpyrrolidone, N-vinylformamide, N-vinylimidazole, vinyl acetate, and styrene. If used, the one or more monoethylenically unsaturated add-free monomers represent less than about 80 percent by weight of the total monomer weight, preferably less than about 60 percent by weight of the total monomer weight.

If desired, it is possible to incorporate polyethylenically unsaturated compounds into the polymerization. Polyethylenically unsaturated compounds function as crosslinking agents and will result in the formation of higher molecular weight polymers.

The polymers useful in the present invention preferably have a weight average molecular weight ("Mw") of at least about 1,000, more preferably from about 1,500 to about 50,000, and most preferably from about 2,000 to about 30,000. At molecular weights below about 1,000, the polymers do not generally perform well as a binder.

Polymers having Mw below about 50,000 are generally considered low molecular weight polymers. Several techniques for preparing low molecular weight polymers are known to those skilled in the art. One such method is by using an increased amount of initiator. One method for preparing low molecular weight polymers uses sodium metabisulfite and sodium persulfate as a redox initiation system. This method produces polymers useful in the present invention. However, for ceramic process where eliminating the production of sulfurous by-products is an objective, this approach for preparing polymers should be avoided. Other techniques for preparing low molecular weight polymers is by incorporating into the monomer mixture one or more chain terminating or chain transfer agents. Suitable chain terminating agents and chain transfer agents are also well known to those skilled in the art of polymerization including, for example, hypophosphorous acid and hypophosphite salts. When preparing low molecular weight polymers, crosslinking agents should be avoided because the presence of crosslinking agents, such as compounds having two or more sites of $\alpha$-$\beta$-unsaturation, results in a dramatic increase in the molecular weight of the resulting polymer.

Other aspects of polymerization, such as the selection and levels of initiators, processing conditions (temperature, pressure, feed rates, stirring), pH and the like are within the ordinary skill of persons skilled in the art of polymerization and do not form a part of the present invention.

The polymers useful in the present invention are generally prepared at a polymers solids level of from about 20 percent to about 70 percent, most preferably from about 25 percent to about 65 percent by weight based on the total weight of the emulsion. The polymers can be used as solutions, but are preferably used in a solid form. The solid form of the polymer may be prepared by drying the polymer, such as by spray-drying, tumbling, vacuum drying and the like.

The one or more ceramic particles and the one or more polymers are mixed by any conventional means, such as by ball milling or mechanical mixing, to form a mixture. If the one or more ceramic particles are used as a slurry, then the mixture is referred to as a wet-mixture. If the one or more ceramic particles and the one or more polymers are dried, then the mixture, together with one or more plasticizers, is referred to as a "semi-wet powder." The one or more polymers are preferably used in amount of from about 1 to about 15 percent, more preferably from about 3 to about 10 percent by weight of the one or more ceramic particles.

In addition, the mixture may contain one or more conventional ceramic processing aids or other conventional additives. Conventional processing aids and additives include, for example, other binders, plasticizers, dispersants, lubricants, sintering aids and foam suppressants. For example, water, poly(ethylene glycol) and alkyl alcohols are known plasticizers. If used, each of the one or more conventional processing aids or other conventional additives may be present at a level of up to about 15, preferably from about 0.1 to about 10 percent by weight based on the weight of the one or more ceramic particles.

If a wet-mixture is prepared, then the wet mixture should be dried by any conventional method such as by tumble drying, pan drying, oven drying, microwave drying and spray drying to produce a dried ceramic mixture. Preferably the wet mixture is dried by spray drying.

To form a ceramic green body, the ceramic mixture is compacted. Methods for compacting, or subjecting the ceramic materials to elevated pressures, to produce ceramic bodies include pressing, extrusion, roll compaction and injection molding. Pressing methods include dry pressing, isostatic pressing and semi-wet pressing. Preferably the ceramic green body is formed from the ceramic mixture by dry pressing at room temperature at a pressure of at least about 1,000 pounds per square inch ("psi"), most preferably from about 2,000 to about 50,000 psi. The resulting green body preferably has a green strength of at least about 0.2, most preferably at least about 0.4 megaPascals ("MPa").

Before the green bodies are milled, drilled, ground, cut or subjected to other conventional machining processes, it is desirable to condition the green bodies. Conditioning the green bodies may result in the removal of trace amounts of water, plasticizers or other additives. The green bodies may be conditioned by allowing them to stand at room temperature, but are preferably conditioned by subjecting them to an elevated temperature of from about 30° C. to about 300° C., more preferably from about 40° C. to about 200° C. Depending upon the temperature, the green bodies are generally conditioned for from about 5 minutes to about 5 days or more.

To form a final ceramic product, the green body is fired, or sintered. The preferred temperature and time needed to sinter a green body to form a final ceramic product is partly dependent upon the type of ceramic used to make the ceramic green body. In general, it is preferred to sinter the ceramic green body to make the final ceramic product by heating the ceramic green body to a temperature of at least about 800° C., most preferably from about 1,000° C. to about 2,000° C., preferably for from about 5 minutes to about 5 hours, most preferably for from about 10 minutes to about 60 minutes.

Ceramic Mixture Preparation

Ceramic mixtures were prepared in the following manner:

To a 00-ball mill jar was added 100 grams of alumina grinding media (approximately ½ inch×½ inch cylinders), ceramic particles (either Alcoa A-16SG alumina having a mean particle size of 0.5 microns or 800 grit silicon carbide), and polymer. The ball mill jar was sealed and the contents were milled for 10–15 minutes at about 84 revolutions per minute. The ball mill jar was opened and the mixture was decanted to separate it from the grinding media. Deionized water and other additives, if used, were added and the mixture was stirred with a spatula.

Evaluation of Green Strength and Green Density

A 0.5 inch diameter hardened steel die with polished surfaces was lubricated with a solution of 2 percent by weight stearic acid and 98 percent by weight acetone. Excess lubricant was removed by buffing. A 1.0 gram sample of ceramic mixture was loaded into the die and compacted for 15 seconds to a pressure of 5,000 psi to form a ceramic green body.

The green strength of the ceramic green bodies was evaluated by measuring the green tensile strength using a diametrical compression test. Green tensile strength is calculated by the following formula:

$$\sigma_F = \frac{2 \cdot p}{\pi \cdot D \cdot l}$$

where $\sigma_F$ is the tensile strength, p is the applied load at failure, D is the diameter of the sample and l is the thickness of the sample. Diametrical compression tests were conducted to determine 'the applied load at failure using a Soiltest® G-900 Versa-loader equipped with a 50 pound electronic force gauge (available from Ametek) operated at a loading rate of 0.005 inches per minute until the sample fractured. The green strength reported in the tables below are the average of at least three measurements reported in MPa.

The densities of the ceramic green bodies reported in the tables below are densities based on an average of four measurements. The green densities were calculated in the following manner:

mass/volume=$\rho$ measured and are reported in the tables below in units of grams per cubic centimeter ("g/cm$^3$").

Measurements of green strength and green density at elevated temperatures reported in the tables below were conducted on samples which had been heated to the temperature indicated, in an oven, for 1–4 hours.

The following polymers appearing in the tables below were evaluated as binders for alumina and silicon carbide according to the above procedure. The polymers had the following compositions and properties:

Polymer A: spray-dried sodium salt of polyacrylic acid having molecular weight of 4,500, prepared using sodium persulfate and sodium metabisulfite.

Polymer B: spray-dried sodium salt of polyacrylic acid having molecular weight of 3,500, prepared using sodium hypophoshite.

Polymer C: spray-dried sodium salt of copolymer of 70 percent by weight acrylic acid and 30 percent by weight methacrylic acid having molecular weight of 3,500.

Polymer D: spray-dried sodium salt of polyacrylic a 2,000, prepared using sodium persulfate and sodium metabisulfite Polymer E: spray-dried sodium salt of poly(acrylic acid) having molecular weight of 50,000 prepared using ammonium persulfate.

Polymer F: spray-dried sodium salt of copolymer of 70 percent by weight acrylic acid and 30 percent by weight maleic acid having molecular weight of 30,000.

Polymer G: spray-dried sodium salt of copolymer of 80 percent by weight acrylic acid and 20 percent by weight maleic acid having molecular weight of 15,000.

Polymer H: spray-dried polyacrylic acid having molecular weight of 3,500, prepared using sodium hypophoshite.

Polymer I: spray-dried ammonium salt of polyacrylic acid having molecular weight of 3,500, prepared using sodium hypophoshite.

Comparative Polymer: Calcium Lignosulfonate
Table I, below, shows the preparations of ceramic mixtures of 50 grams of Alcoa A-16SG alumina and the amount (in grams) and type of polymer and amount of deionized water as shown.

strengths and green densities comparable to or better than green bodies prepared with lignosulfonate.

Table III, below, shows the preparations of ceramic

TABLE I

| Example | Polymer Type | Polymer Amount (g) | Water Amount (g) | Note |
|---|---|---|---|---|
| 1 | Polymer A | 2.5 | 2.5 | ball mill only |
| 2 | Polymer F | 2.5 | 2.5 | ball mill only |
| 3 | Polymer G | 2.5 | 2.5 | ball mill only |
| 4 | Polymer C & A | 1.25 each | 2.5 | ball mill only |
| 5 | Polymer D | 2.5 | 2.5 | ball mill only |
| 6 | Polymer E | 2 | 2.5 | ball mill only |
| 7 | Polymer B* | 5.75 | 3.25 | ball mill only |
| 8 | Lignosulfonate | 2.5 | 2.5 | ball mill only |
| 9 | Polymer B | 2.5 | 2 | ball mix and hand mix |
| 10 | Polymer C & A | 1.25 each | 2 | ball mix and hand mix |
| 11 | Lignosulfonate | 2.5 | 2 | ball mix and hand mix |
| 12 | Polymer C & A | 1.25 each | 1 | blender mixed |
| 13 | Polymer C & A | 1.25 each | 1 | blender mixed |
| 14 | Polymer C & A | 1.25 each | 1 | blender mixed |
| 15 | Polymer C & A | 1.25 each | 2.5 | |
| 16 | Polymer C & A | 1.25 each | 3.5 | |
| 17 | Polymer C & A | 1.25 each | 5 | |
| 18 | Polymer H | 2.5 | 3.5 | |
| 19 | Polymer I | 2.5 | 3.5 | |
| 20 | Polymer H | 2.5 | 3.5 | |
| 21 | Polymer H | 2.5 | 3.5 | |
| 22 | Polymer H | 2.5 | 3.5 | |
| 23 | Polymer I | 2.5 | 3.5 | |
| 24 | Polymer H | 2.5 | 3.5 | |
| 25 | Polymer A** | 2.5 | 3.5 | |
| 26 | Polymer A | 2.5 | 3.5 | |

*Polymer B was used as a 43% by weight aqueous polymer solution.
**Polymer A was used in the acid form rather than the sodium salt form.

The data in Table II show the green density and green strength for the ceramic mixtures shown in Table I above.

mixtures silicon carbide ("SIC") prepared from silicon carbide in the amount shown, and the amount (in grams) and type of polymer and amount of deionized water as

TABLE II

| Example | Green Density (g/cm3, 25° C.) | Green Strength (MPa, 25° C.) | Green Density (g/cm3, 420° C.) | Green Strength (MPa, 420° C.) |
|---|---|---|---|---|
| 1 | 2.34 | 0.62 | 2.23 | 2.46 |
| 2 | 2.18 | 0.22 | 2.06 | 0.16 |
| 3 | 2.25 | 0.34 | 2.15 | 0.37 |
| 4 | 2.30 | 0.66 | 2.20 | 2.56 |
| 5 | 2.30 | 0.48 | 2.21 | 1.53 |
| 6 | 2.27 | 0.41 | 2.13 | 0.67 |
| 7 | 2.22 | 0.30 | 2.16 | 0.53 |
| 8 | 2.27 | 2.02 | 2.18 | 1.64 |
| 9 | 2.34 | 0.42 | 2.17 | 0.90 |
| 10 | 2.30 | 0.52 | 2.20 | 0.46 |
| 11 | 2.23 | 1.54 | 2.14 | 0.97 |
| 12 | | | 2.06 | 0.37 |
| 13 | | | 2.11 | 0.41 |
| 14 | | | 2.19 | 0.99 |
| 15 | 2.34 | 0.53 | 2.31 | 2.03 |
| 16 | 2.40 | 0.74 | 2.30 | 2.99 |
| 17 | 2.40 | 0.88 | 2.34 | 2.27 |
| 18 | 2.25 | 3.50 | 2.18 | 0.94 |
| 19 | 2.37 | 0.67 | 2.27 | 2.37 |
| 20 | 2.37 | 0.50 | | |
| 21^ | 2.25 | 1.30 | | |
| 22^^ | 2.25 | 3.56 | 2.16 | 1.18 |
| 23^^ | 2.39 | 0.58 | 2.28 | 1.54 |
| 24^^ | 2.29 | 1.20 | 2.16 | 1.02 |
| 25 | 2.34 | 0.59 | 2.17 | 2.29 |
| 26 | 2.44 | 0.47 | 2.31 | 3.47 |

^ the green body was conditioned at 60° C. for 5 hours before measurements were taken.
^^ the green body was conditioned at room temperature for 4 days before measurements were taken

TABLE

The data in Table II show that the green bodies prepared according to the present invention have green shown. Where noted, the pH of the deionized water was adjusted with either hydrochloric acid or ammonium hydroxide. Also, poly(ethylene glycol) ("PEG") having a molecular weight of 200 was used in the amounts indicated in Examples 28 and 37.

TABLE III

| Example | Amount SiC | Polymer Type | Polymer Amount (g) | Water Amount (g) | Note |
| --- | --- | --- | --- | --- | --- |
| 27 | 50 | Polymer H | 2 | 3.5 | |
| 28 | 50 | lignosulfonate | 2 | 2 | 0.5 g PEG |
| 29 | 20 | Polymer I | 0.8 | 0.7 | pH 3 |
| 30 | 20 | Polymer I | 0.8 | 0.7 | pH 6 |
| 31 | 20 | Polymer I | 0.8 | 0.7 | pH 9 |
| 32 | 20 | Polymer I | 0.8 | 0.7 | pH 11 |
| 33 | 50 | Polymer H | 2 | 1.75 | |
| 34 | 50 | Polymer I | 2 | 2.5 | |
| 35 | 50 | Polymer I | 2 | 3.5 | |
| 36 | 50 | Polymer I | 2 | 4.5 | |
| 37 | 50 | lignosulfonate | 2 | 2 | 0.5 g PEG |
| 38 | 50 | Polymer H & I | 1 each | 3.5 | |
| 39 | 50 | Polymer H | 2 | 3.5 | pH 3 |
| 40 | 50 | Polymer H | 2 | 3.5 | pH 11 |
| 41 | 40 | Polymer H | 1.6 | 1.2 | |
| 42 | 40 | Polymer H | 1.6 | 2 | |
| 43 | 40 | Polymer H | 2.6 | 2.8 | |

The data in Table IV show the green density and green strength for the ceramic mixtures shown in Table III above.

TABLE IV

| Example | Green Density (g/cm3, 25° C.) | Green Strength (MPa, 25° C.) | Green Density (g/cm3, 120° C.) | Green Strength (MPa, 120° C.) | Green Density (g/cm3, 420° C.) | Green Strength (MPa, 420° C.) |
| --- | --- | --- | --- | --- | --- | --- |
| 27 | 1.76 | 0.07 | 1.65 | 1.96 | 1.57 | 0.14 |
| 28 | 1.83 | 0.03 | 1.64 | 0.22 | 1.57 | 0.12 |
| 29 | 1.70 | 0.16 | 1.63 | 1.02 | 1.61 | 0.25 |
| 30 | 1.68 | 0.27 | 1.64 | 1.28 | 1.60 | 0.23 |
| 31 | 1.67 | 0.37 | 1.64 | 1.26 | 1.60 | 0.27 |
| 32 | 1.68 | 0.54 | 1.64 | 1.38 | 1.58 | 0.25 |
| 33 | 1.66 | 0.72 | 1.68 | 1.83 | 1.59 | 0.1 |
| 34 | 1.71 | 0.03 | 1.66 | 0.67 | 1.60 | 0.17 |
| 35 | 1.74 | 0.03 | 1.66 | 0.75 | 1.61 | 0.19 |
| 36 | 1.78 | 0.03 | 1.66 | 0.84 | 1.61 | 0.19 |
| 37 | 1.69 | 0.11 | 1.65 | 0.25 | 1.58 | 0.07 |
| 38 | 1.68 | 0.28 | 1.65 | 2.65 | 1.6 | 0.18 |
| 39 | 1.67 | 0.56 | | | | |
| 40 | 1.72 | 0.27 | | | | |
| 41 | 1.67 | 0.09 | | | | |
| 42 | 1.68 | 0.26 | | | | |
| 43 | 1.72 | 0.24 | | | | |

The data in Table IV show that the green bodies prepared according to the present invention have green strengths and green densities comparable to or better than green bodies prepared with lignosulfonate.

Preparation of Machinable Parts

Machinable parts were prepared in the following manner:

Ceramic mixtures were prepared in a similar manner as described above using the amounts of alumina, polymer and water as shown in Table V below. When used, the internal lubricants and plasticizers were dissolved in the water.

TABLE V

| Example | Alumina (g) | Polymer Type | Polymer Amount (g) | Water Amount (g) | Additive Type | Additive Amount (g) |
| --- | --- | --- | --- | --- | --- | --- |
| 44 | 300 | H | 15 | 21 | none | none |
| 45 | 200 | H | 10 | 14 | aluminum stearate | 0.3 |
| | | | | | poly(ethylene glycol)* | 2.0 |
| 46 | 250 | H | 12.5 | 17.5 | aluminum stearate | 0.75 |
| | | | | | poly(ethylene glycol)* | 5.0 |

*The poly(ethylene glycol) used had a molecular weight of 200.

Machinable green parts were prepared from the ceramic mixtures in the following manner: A 1.2 inch diameter cylindrical hardened steel die or a 1 inch by 2.5 inch rectangular die with polished surfaces was lubricated with a solution of 2 percent by weight stearic acid and 98 percent by weight acetone. Excess lubricant was removed by buffing. A 15-35 gram sample of ceramic mixture was loaded into the die and compacted for 30 seconds to a pressure of 4,000 psi to form a ceramic green body. The green bodies were then conditioned by heating the green bodies in a convection oven to 60° C. for 2 hours. After the green bodies were conditioned, they were subjected to various machining processes as set forth in Table VI below. After being machined, the green bodies were sintered by heating them to about 400° C. for 1-4 hours, then to 1650° C.-1700° C. at a rate of from 1° to 5 ° C./minute ("Sintering Condition") and held at 1650° C.-1700° C. for from about 0.5 to about 1.5 hours. Other observations after machining and after sintering (Final Ceramic Product) are shown in Table VI below.

TABLE VI

| Example | Machining | Observations upon Machining | Sintering Condition (°C./minute) | Observations of Final Ceramic Product |
|---|---|---|---|---|
| 44 | lathed, drilled, sanded, | smooth surfaces no cracking no chipping | 2 | smooth surfaces 1-2 major fractures no star-cracking no chipping |
| 45 | lathed, milled, drilled, sanded, cut, | smooth surfaces some hairline cracking no chipping | 2 | smooth surfaces 1 major fractures no star-cracking no chipping |
| 46 | lathed, milled, drilled, sanded, cut, | smooth surfaces some hairline cracking no chipping | 5 | smooth surfaces no fractures no star-cracking no chipping |

The data in Table VI show that the green bodies prepared according to the present invention have sufficiently high green strengths so that the green bodies can be machined to a desired shape.

I claim:

1. A machinable ceramic green body comprising;
   (a) ceramic particles; and
   (b) one or more binders at a level of from about I to about 15 percent by weight based on the ceramic particles; wherein the one or more binders are selected from the group consisting of polymers comprising, as polymerized units, at least 40 percent by weight of one or more monoethylenically unsaturated acids, and salts thereof selected from the group consisting of monoethylenically unsaturated carboxylic acids, and salts thereof and from 0 to about 60 percent by weight of one or more monoethylenically unsaturated acid-free monomers.

2. The machinable ceramic green body of claim 1, wherein: the ceramic particles are selected from the group consisting of alumina, aluminum nitride, silica, silicon, silicon carbide, silicon nitride, sialon, zirconia, zirconium nitride, zirconium carbide, zirconium boride, titania, titanium nitride, titanium carbide, barium titanate, titanium boride, boron nitride, boron carbide, tungsten carbide, tungsten boride, tin oxide, ruthenium oxide, yttrium oxide, magnesium oxide, calcium oxide, and mixtures thereof.

3. The machinable ceramic green body of claim 1, wherein: the ceramic particles are selected from the group consisting of alumina, aluminum nitride, zirconia, silicon nitride and silicon carbide.

4. The machinable ceramic green body of claim 1, wherein: said monoethylenically unsaturated carboxylic acids, and salts thereof are selected from the group consisting of acrylic acid, methacrylic acid, maleic acid, and alkali metal and ammonium salts thereof.

5. The machinable ceramic green body of claim 1, wherein: the polymer is selected from the group consisting of homopolymers of acrylic acid and alkali metal and ammonium salts thereof.

6. The machinable ceramic green body of claim 1, wherein:
   (a) the ceramic particles are present at a level of from about 10 to about 98 percent by weight of the ceramic green body;
   (b) the binders are present at a level of from about 1 to about 15 percent by weight of the ceramic particles; and further comprising
   (c) water at a level of from about 0.1 to about 10 percent by weight based on the ceramic particles; and
   (d) conventional ceramic processing aids or other conventional additives at a level of from about 0.1 to about 10 percent by weight of the ceramic particles.

* * * * *